(12) United States Patent
Sahinoglu et al.

(10) Patent No.: US 7,539,267 B2
(45) Date of Patent: May 26, 2009

(54) IMPULSE RADIO SYSTEMS WITH MULTIPLE PULSE TYPES

(75) Inventors: Zafer Sahinoglu, Somerville, MA (US); Sinan Gezici, Princeton, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 645 days.

(21) Appl. No.: 10/923,481

(22) Filed: Aug. 20, 2004

(65) Prior Publication Data

US 2006/0039447 A1 Feb. 23, 2006

(51) Int. Cl.
*H04L 27/00* (2006.01)

(52) U.S. Cl. .................. 375/295; 375/130; 375/340; 375/351; 455/103; 455/102; 455/168.1; 455/20; 455/91; 327/291; 332/106; 341/20; 341/174

(58) Field of Classification Search .................. 375/295, 375/340, 351; 455/103, 102, 168.1, 20, 91; 327/291; 332/106; 341/20, 174
See application file for complete search history.

(56) References Cited

U.S. PATENT DOCUMENTS

| | | | |
|---|---|---|---|
| 6,614,384 B2 | 9/2003 | Hall et al. ..................... 342/28 |
| 7,020,226 B1 * | 3/2006 | Kirkland ..................... 375/355 |
| 7,184,719 B2 * | 2/2007 | Roberts ..................... 455/103 |
| 7,187,715 B2 * | 3/2007 | Balachandran et al. ...... 375/242 |
| 2003/0108133 A1 * | 6/2003 | Richards ..................... 375/351 |
| 2004/0199289 A1 * | 10/2004 | Glenn et al. ................. 700/245 |
| 2004/0202230 A1 * | 10/2004 | Dowla et al. ................. 375/147 |
| 2004/0218687 A1 * | 11/2004 | Santhoff ..................... 375/295 |
| 2005/0013390 A1 * | 1/2005 | Tufvesson ................... 375/340 |
| 2005/0135314 A1 * | 6/2005 | Giannakis et al. ........... 370/335 |
| 2005/0175125 A1 * | 8/2005 | Krivokapic ................. 375/340 |
| 2005/0275513 A1 * | 12/2005 | Grisham et al. ............. 340/435 |
| 2006/0234761 A1 * | 10/2006 | Nagasaka ................. 455/552.1 |

OTHER PUBLICATIONS

F. Elbahhar et al ("Using UWB Gaussian pulses for inter-vehicle communications", IEE Proc-Commun., vol. 152, No. 2, Apr. 2005, pp. 229-234).*

(Continued)

*Primary Examiner*—Shuwang Liu
*Assistant Examiner*—Helene Tayong
(74) *Attorney, Agent, or Firm*—Dirk Brinkman; Gene Vinokur

(57) ABSTRACT

A method signals in an ultra-wide bandwidth network. A data symbol is generated. A set of reference pulses is transmitted for the data symbol. Each reference pulse is of a different type. One data pulse is also transmitted for each reference pulse. A type of each data pulse is identical to the type of the corresponding reference pulse.

8 Claims, 4 Drawing Sheets

OTHER PUBLICATIONS

R. Hoctor and H. Tomlinson, "Delay-hopped transmitted-reference RF communications," *Proceedings of the IEEE Conference of Ultra Wideband Systems and Technologies 2002 (UWBST'02)*, pp. 265-269, May 2002.

N. v. Stralen, A. Dentinger, K. Welles II, R. Gaus, R. Hoctor, and H. Tomlinson, "Delay hopped transmitted reference experimental results," *Proceedings of the IEEE Conference of Ultra Wideband Systems and Technologies 2002 (UWBST'02)*, pp. 93-98, May 2002.

F. Tufvesson and A. F. Molisch, "Ultra-wideband communication using hybrid matched filter correlation receivers," *Proc. IEEE Vehicular Technology Conference (VTC 2004 Spring)*, Milan, Italy, May 17-19, 2004.

J. D. Choi and W. E. Stark, "Performance of ultra-wideband communications with suboptimal receivers in multipath channels," *IEEE Journal on Selected Areas in Communications*, vol. 20, issue 9, pp. 1754-1766, Dec. 2002.

M. Z. Win, R. A. Scholtz, "Impulse radio: How it works," *IEEE Communications Letters*, 2(2): pp. 36-38, Feb. 1998.

Y.-P. Nakache and A. F. Molisch, "Spectral shape of UWB signals influence of modulation format, multiple access scheme and pulse shape," *Proceedings of the IEEE Vehicular Technology Conference, (VTC 2003-Spring)*, vol. 4, pp. 2510-2514, Apr. 2003.

E. Fishler and H. V. Poor, "On the tradeoff between two types of processing gain," *Proceedings of the 40th Annual Allerton Conference on Communication, Control, and Computing*, Monticello, IL, Oct. 2, 2002.

\* cited by examiner

100

200

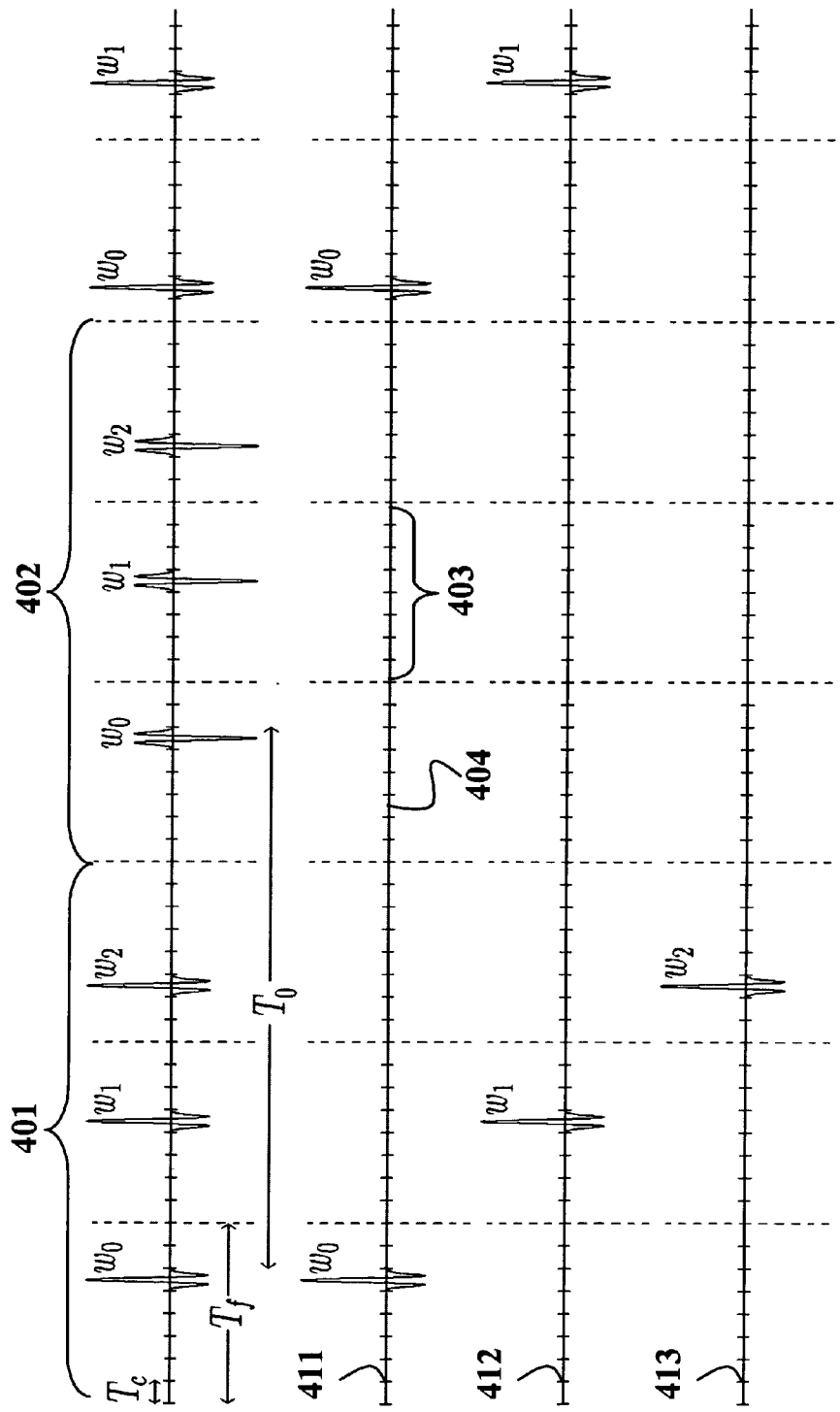

IMPULSE RADIO SYSTEMS WITH MULTIPLE PULSE TYPES

FIELD OF THE INVENTION

The present invention relates generally to radio communication systems, and more particularly to ultra wide bandwidth (UWB) systems.

BACKGROUND OF THE INVENTION

With the release of the "First Report and Order", Feb. 14, 2002, by the Federal Communications Commission (FCC), interest in ultra wide bandwidth (UWB) systems has increased considerably. UWB systems spread information over a wide bandwidth of at least 500 MHz. Due to this spreading operation, a power spectral density is small. Therefore, interference to narrow bandwidth receivers is also small.

Transmitters for low data rate transmitted reference UWB systems (TR-UWB) are described by R. Hoctor and H. Tomlinson, "Delay-hopped transmitted-reference RF communications," *Proceedings of the IEEE Conference of Ultra Wideband Systems and Technologies* 2002 (*UWBST'02*), pp. 265-269, May 2002, N. v. Stralen, A. Dentinger, K. Welles II, R. Gaus, R. Hoctor, and H. Tomlinson, "Delay hopped transmitted reference experimental results," *Proceedings of the IEEE Conference of Ultra Wideband Systems and Technologies* 2002 (*UWBST'02*), pp. 93-98, May 2002, F. Tufvesson and A. F. Molisch, "Ultra-wideband communication using hybrid matched filter correlation receivers," *Proc. IEEE Vehicular Technology Conference* (*VTC* 2004 Spring), Milan, Italy, May 17-19, 2004, and J. D. Choi and W. E. Stark, "Performance of ultra-wideband communications with suboptimal receivers in multipath channels," *IEEE Journal on Selected Areas in Communications*, vol. 20, issue 9, pp. 1754-1766, December 2002.

Those low data rate systems relax stringent timing requirements of the impulse radio (IR) systems, M. Z. Win, R. A. Scholtz, "Impulse radio: How it works," *IEEE Communications Letters*, 2(2): pp. 36-38, February 1998, and do not need any channel estimation. Channel estimation is a challenging task for coherent UWB receivers, Lottici, A. D'Andrea, and U. Mengali, "Channel estimation for ultra-wideband communications," *IEEE Journal on Selected Areas in Communications*, vol. 20, issue 9, pp. 1638-1645, December 2002.

In the prior art, two basic receiver schemes are known, namely rake receiver with matched filters, see Choi et al., and a transmitted reference scheme that uses a pulse correlator, see Hoctor et al., "*Delay-hopped transmitted reference RF communications*," IEEE Conf. on Ultra Wideband Systems and Technologies, pp 265-270, 2002.

The rake approach requires channel estimation for the combining of a selected number of multi-path components. Because the receiver structure is fairly complex, only the strongest, or a few of the strongest multi-path components are used to form the decision variable. That means that the receiver does not fully resolve all multi-path components, and the performance is less than ideal due to the inherent channel estimation and combining problem. Increasing the number of rake fingers increases the complexity and cost of the system.

In transmitted reference schemes, pairs of transmitted pulses are used for each data symbol. The first pulse, called the reference pulse, is not modulated by the data symbol. The second pulse, called the data pulse, is modulated by the data symbol. The reference and data pulses are separated by a time delay. The receiver recovers the data symbol by multiplying time-aligned pulses, which results in a large correlation peak. The different peaks all have the same phase. The phase is determined by the value of the data symbol, and therefore, as an advantage, they can be summed by an integrator. This scheme is less complex and is able to combine the energy from different multi-path components without channel estimation. Unfortunately, the output of the multiplier has a very poor signal-to-noise ratio (SNR) due to non-linear operations on noise terms when forming the decision variable and due to the inherent energy loss when transmitting the reference pulse. That results in large noise-times-noise terms that are integrated over the time. The received signal can be passed through a matched filter to reduce the effects of noise-times-noise terms, see Tufvesson et al., or an averaging operation can be performed, see Choi et al. However, overall, the transmitted reference scheme has a worse performance when compared with the ideal rake approach, due to the noise products.

In the prior art, a single pulse type is used for all signals communicated between a given transmitter and receiver. That is, all reference pulses and all data pulses are of the same type, e.g., all are a Gaussian, or alternatively a monocycle Gaussian. By having the same pulse type for all signals, the likelihood of inter-frame interference (IFI) and multi-access interference (MAI) is increased. Therefore, there is a need for a UWB system that decreases IFI and MAI.

SUMMARY OF THE INVENTION

The invention provides a method and system for transmitting and receiving radio signals in a multi-pulse transmitted-reference impulse ultra wideband communications system. To transmit a data symbol, a transmitter sends multiple reference pulses, each being of a different type, and multiple data pulses corresponding in number and types to the number and types of the reference pulses. The pulses are sent according to a predetermined structure that depends on the number and types of the pulses. By using multiple different types of pulses, interference is reduced.

Instead of sending a reference and a data pulse in each frame, as in the prior art, the invention first transmits a set of $N_p$ different reference pulses in the first $N_p$ frames. Then, a set of $N_p$ different data pulses are transmitted in the next $N_p$ frames, and so forth, alternating the sets of reference and data pulses.

The receiver processes the received signal by means of $N_p$ parallel branches. Each branch gathers information from the pulses of a specific type by using template signals specific for each type of pulse. The decision variables for the $N_p$ parallel branches are combined to estimate the output data symbol of the receiver.

The system according to the invention facilitates the use of multiple different pulses for improved interference rejection. Complexity constraints, interference effects and the signal-to-noise ratio of the system are the main factors to be considered when selecting the number of different pulse types $N_p$.

Because different branches are used for different pulse types, it is now possible to use different combining schemes, such as equal gain combining or weighting according to the pulse types, and to adapt the hard decisions and majority decisions for contributions from different pulse types.

BRIEF DESCRIPTION OF THE DRAWINGS

FIG. 4 is a timing diagram of a radio signal for an ultra wide band system according to the invention.

DETAILED DESCRIPTION OF THE PREFERRED EMBODIMENT

Signal Structure

Figure 1:
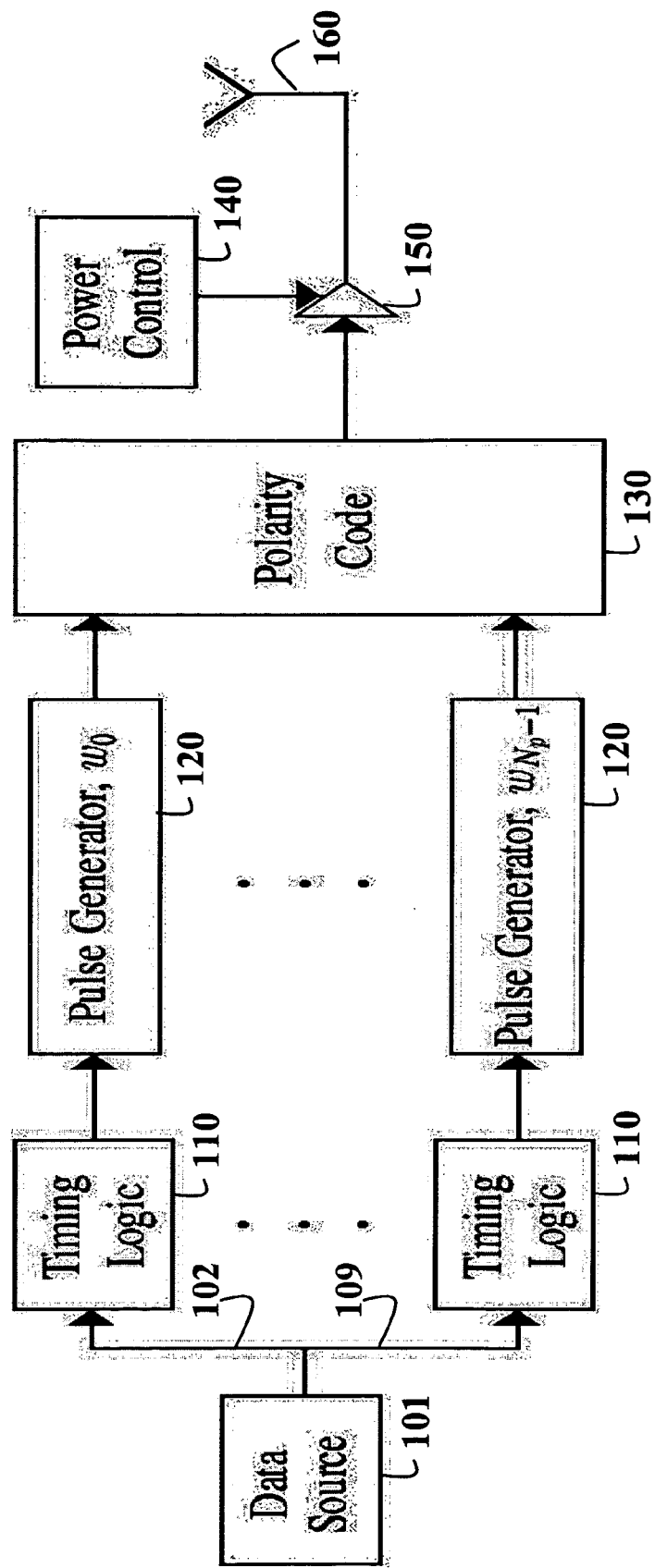
FIG. 1 is a block diagram of a transmitter according to the invention.

A transmitted signal s(t) for an ultra wide bandwidth (UWB) system according to the invention is expressed as $$s(t) = \sqrt{\frac{1}{N_f}} \sum_{i=-\infty}^{\infty} \sum_{n=0}^{N_p-1} s_{n,i}(t), \quad (1)$$

where $N_f$ is the number of pulses per information bit or data symbol, $N_p$ is the number of different pulse types, with n being an index for the pulse type, and i being an index for the data symbol. For simplicity of the expressions, the number of pulses $N_f$ is assumed to be an even multiple of the number of data symbols. However, this is not required. The variable $s_{n,i}(t)$ is expressed as $$s_{n,i}(t) = \sum_{j=iN_f/(2N_p)}^{(i+1)\frac{N_f}{2N_p}-1} \left[ d_{jN_p+n} w_n(t - (2N_p j + n)T_f - c_{jN_p+n}T_c) + b_{\lfloor 2N_p j/N_f \rfloor} d_{jN_p+n} w_n(t - (2N_p j + n)T_f - c_{jN_p+n}T_c - T_n) \right]. \quad (2)$$

In equation (2), $w_n(t)$ is the UWB pulse of type n, $T_f$ is the frame interval, and $T_c$ is the chip interval. A time-hopping (TH) code is denoted by $c_j$, which is an integer taking values in the set $\{0, 1, \ldots, N_c-1\}$, with $N_c$ being the number of chips per frame. This prevents catastrophic collisions between different users.

The random polarity, or the spreading, code, $d_j \in \{-1, +1\}$, changes the polarities of the pulses, which smoothes the power spectral density of the transmitted signal, Y.-P. Nakache and A. F. Molisch, "Spectral shape of UWB signals influence of modulation format, multiple access scheme and pulse shape," *Proceedings of the IEEE Vehicular Technology Conference*, (*VTC* 2003-Spring), vol. 4, pp. 2510-2514, April 2003, and provides robustness against multi-access interference (MAI), E. Fishler and H. V. Poor, "On the tradeoff between two types of processing gain," *Proceedings of the 40th Annual Allerton Conference on Communication, Control, and Computing*, Monticello, Ill., Oct. 2, 2002.

The information bit or data symbol is denoted by $b \lfloor 2N_p j/N_f \rfloor \in \{-1, +1\}$, and is carried by the data pulses. In other words, the second pulse in equation (2) represents the data pulse, while the first pulse is the reference pulse. $T_n$ determines a distance between the reference and the data pulses for the $n^{th}$ pulse type.

A number of different pulse types are known, e.g., Gaussian, Gaussian monocycle, Gaussian doublet, etc., see U.S. Pat. No. 6,614,384, "System and method for detecting an intruder using impulse radio technology," issued to Hall et al., Sep. 2, 2003.

FIG. 4 shows example signals 400 according to the invention. It should be noted that the pulses in FIG. 4 actually have three different shapes as indicated by $w_0$, $w_1$, and $w_2$, see U.S. Pat. No. 6,614,384 for exemplary pulse types. In FIG. 4, there are three different reference pulses 401 and three corresponding data pulses 402, i.e., $N_p=3$.

For the signal as shown, the number of frames 403 ($N_f$) is twelve, i.e., the sequence of six pulses 401-402 is repeated twice. FIG. 4 only shows the first eight of twelve frames. The number of chips ($N_c$) 404 in each frame is eight, and $T_n=\Delta T_c$ for n=1, 2, 3, with $\Delta=12$. The TH sequence is $\{5, 4, 2, 1, 2, 0\}$. For simplicity, no polarity codes are shown, i.e., $d_j=1 \forall j$. In the example, the data symbol is '−1', and the first, second, third, seventh, eighth, and ninth pulses are the reference pulses, while the remaining pulses are the data pulses.

The signals 411-413 are template pulses used in a receiver according to the invention, see FIGS. 2 and 3 below.

Transmitter Structure

FIG. 1 shows a transmitter 100 according to the invention. A data source 101 generates data symbols. Multiple copies 102-109 of the data symbols are subject to timing logic 110 and a pulse generator 120. There is one copy for each pulse type $w_0, w_1, \ldots, w_{N_p-1}$. A polarity code 130 is applied to the pulse sequences, before amplification 140, 150, and transmission via an antenna 160.

Receiver Structure

Figure 2:
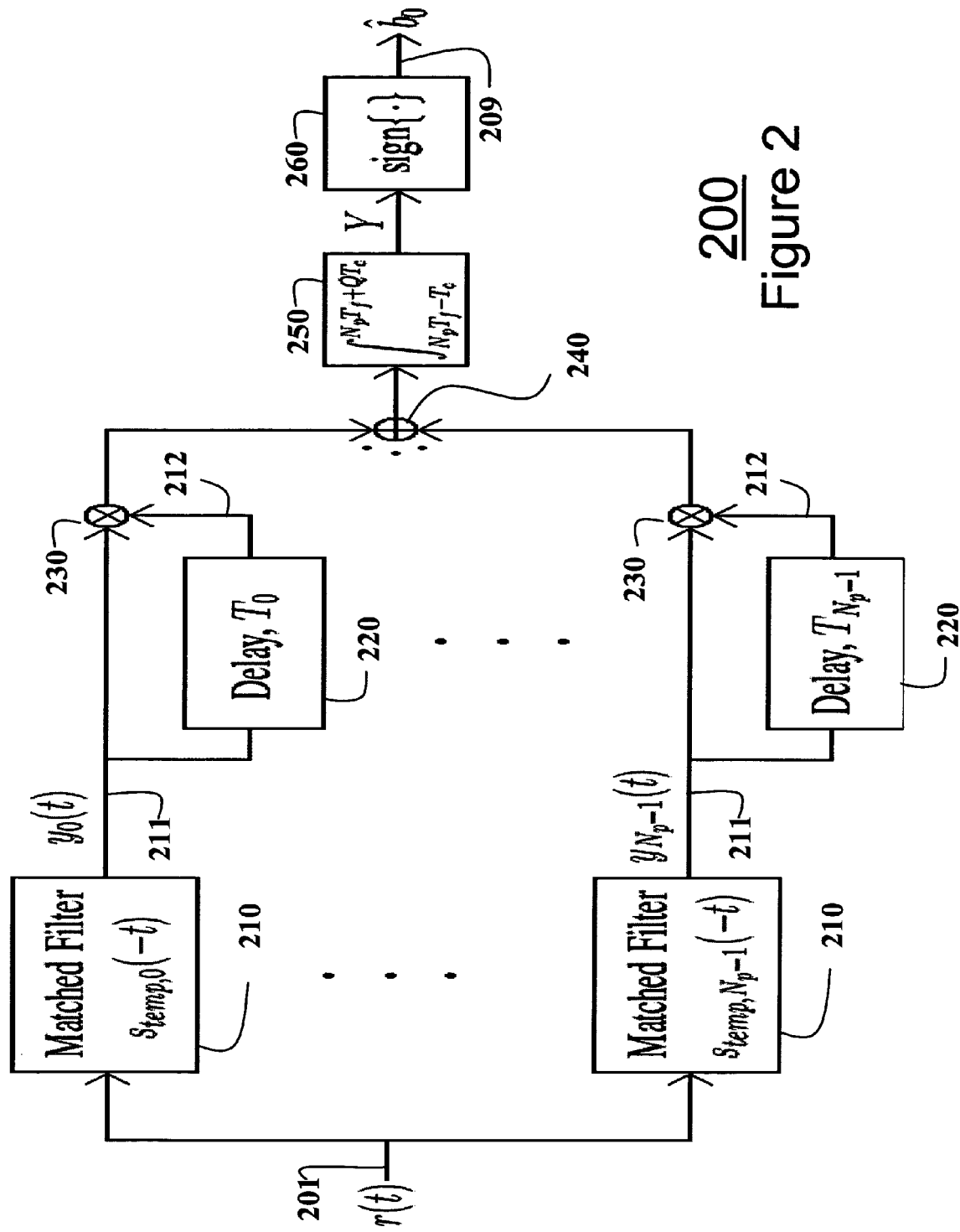
FIG. 2 is a block diagram of a receiver according to the invention.

In a receiver 200 as shown in FIG. 2, a received signal 201 corresponding to the above transmitted signal in a single user multipath environment is $$r(t) = \sum_{l=0}^{L-1} \alpha_l s(t - \tau_l) + \sigma n(t), \quad (3)$$

where $\alpha_l$ and $\tau_l$ are respectively a fading coefficient and a delay of the $l^{th}$ path, and n(t) is a zero mean white Gaussian process with unit spectral density.

The receiver 200 includes a bank of matched filters 210, one for each branch. The number of branches is equal to the number of pulse types. Each filter uses one of the corresponding template signals $s_{temp}(-t)$ 411-413. Each filter is connected to a corresponding delay 220 and multiplier 230. An integrator 250 is used to determine a signed 260 output symbol estimate 209.

Because different branches are used for different pulse types, it is now possible to use different combining schemes, such as equal gain combining or weighting according to the pulse types, and to adapt the hard decisions and majority decisions for contributions from different pulse types.

The received signal 201 is first passed through the matched filters 210. Each filter matches to a different pulse shape as determined by the corresponding template signal. The template signal for the $n^{th}$ filter is $$s_{temp,n}(t) = \sum_{j=0}^{N_f/(2N_p)-1} d_{jN_p+n} w_n(t - (2N_p j + n)T_f - c_{jN_p+n}T_c), \quad (4)$$

where the $0^{th}$ bit is considered, without loss of generality.

The output 211 of the filter at the nth branch is $$y_n(t) = \int r(\tau) s_{temp,n}(\tau-t) d\tau. \quad (5)$$

Then, the output of the $n^{th}$ filter is multiplied 230 by a delayed version 212 and all of the decision variables $\{Y_n\}_{n=0}^{N_p-1}$ are combined 240. When $T_n=N_pT_f$ for all n, we can express the sum of the decision variables as $$Y \triangleq \sum_{n=0}^{N_p-1} Y_n = \int_{N_pT_f-T_c}^{N_pT_f+QT_c} \left[ \sum_{n=0}^{N_p-1} y_n(t)y_n(t-N_pT_f) \right] dt, \quad (6)$$

hence we can use just a single integral operation 250. In equation (6), Q is an integer that determines the integration interval. Finally, we estimate 250 the signed 260 information bit or transmitted data symbol 209 as $$\hat{b}_0 = \text{sign}\left\{ \sum_{n=0}^{N_p-1} Y_n \right\}, \quad (7)$$

where the contributions from different branches can be weighted as well depending on some factors, such as the pulse shape.

Figure 3:
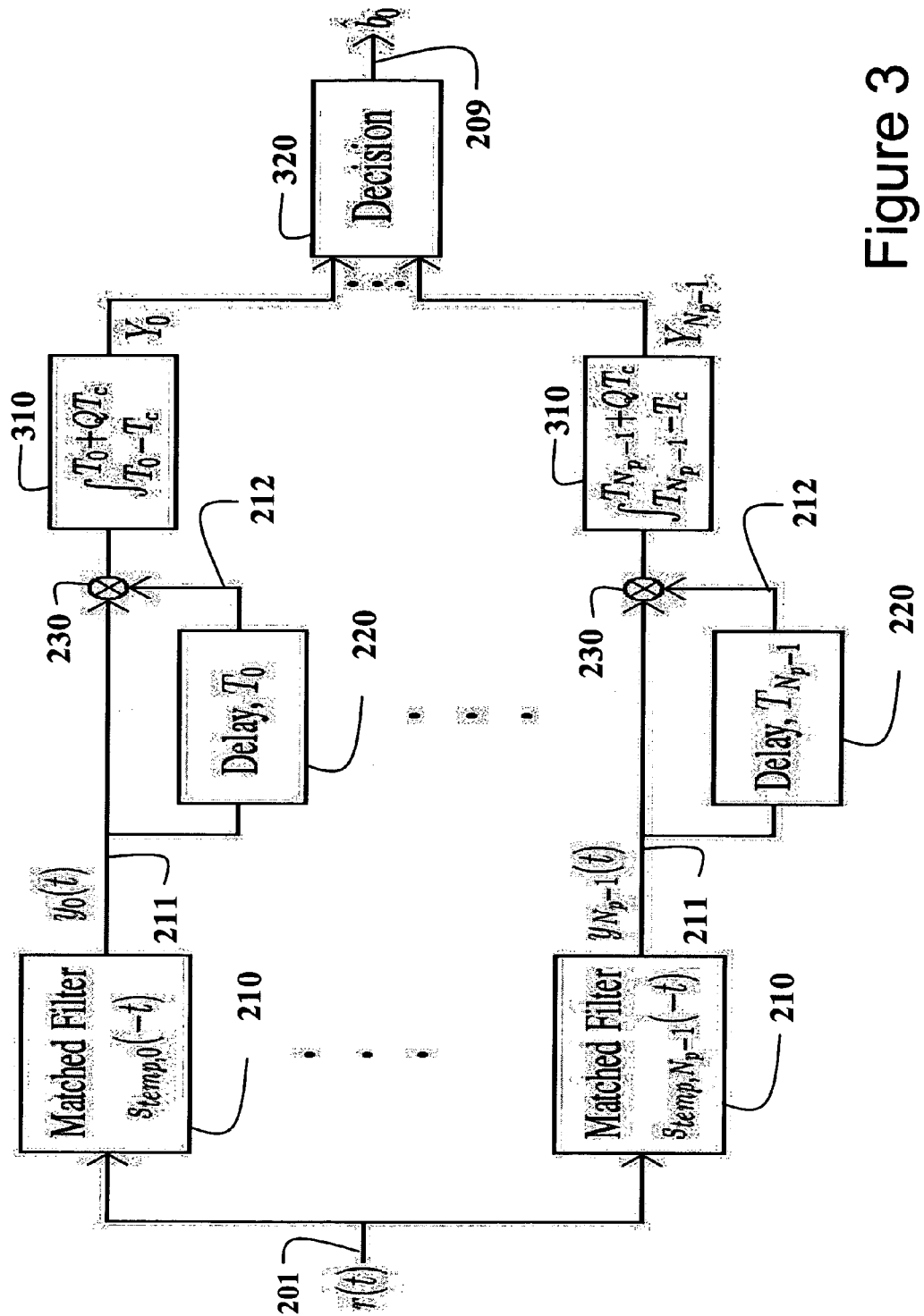
FIG. 3 is a block diagram of an alternative receiver according to the invention.

Alternatively, as shown in FIG. 3, decision variable can be determined 310 at each branch, using $$Y_n = \int_{T_n-T_c}^{T_n+QT_c} y_n(t)y_n(t-T_n)dt, \quad (8)$$

and a majority rule, averaging or some other decision process 320 can be used to estimate the data symbol 209.

As an advantage, the system according to the invention provides resistance against multi-access interference and inter-frame interference, because different pulse shapes with good cross-correlation properties can be used.

Depending on the effectiveness of the noise components and the complexity constraints, an optimal $N_p$ can be selected for the system.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for signaling in an ultra wide bandwidth communications system, comprising:
   generating a sequence of data symbols;
   transmitting sequentially, for each data symbol, a set of reference pulses, in which the set includes a plurality of reference pulses and each reference pulse being of a different type;
   transmitting sequentially a set of data pulses, there being one data pulse for each corresponding reference pulse, a type of each data pulse being identical to the type of the corresponding reference pulse, in which the set of data pulses are transmitted after the set of reference pulses;
   receiving the set of reference pulses and the set of data pulses, in which the set of data pulses are received after the set of reference pulses;
   filtering each data pulse according to a matching template pulse specific for the type of the corresponding reference pulse; and
   multiplying each filtered data pulse by a delayed version of the received data pulse to recover the data symbol, and in which received data pulse is weighted according to the pulse type.

2. The method of claim 1, in which each set of reference pulses and the corresponding set of data pulses are transmitted a plurality of times for each data symbol.

3. The method of claim 1, in which the pulse types are selected from a group consisting of Gaussian, Gaussian monocycle, a first derivative of the Gaussian monocycle, a second derivative of the Gaussian monocycle, a third derivative of the Gaussian monocycle, and a Gaussian doublet.

4. The method of claim 1, in which there are three pulses in the set of reference pulses and three pulses in the set of data pulses.

5. The method of claim 1, in which the pulses are received in a receiver, and in which the receiver includes a plurality of branches, and each branch includes a matched filter, there being one matched filter for each type of pulse.

6. The method of claim 5, further comprising:
   combining outputs of the plurality of branches; and
   integrating the combined outputs to recover the data symbol.

7. The method of claim 5, further comprising:
   integrating an output of each branch; and
   combining the integrated outputs to recover the data symbol.

8. The method of claim 7, in which the combining determines an average.

* * * * *